UNITED STATES PATENT OFFICE.

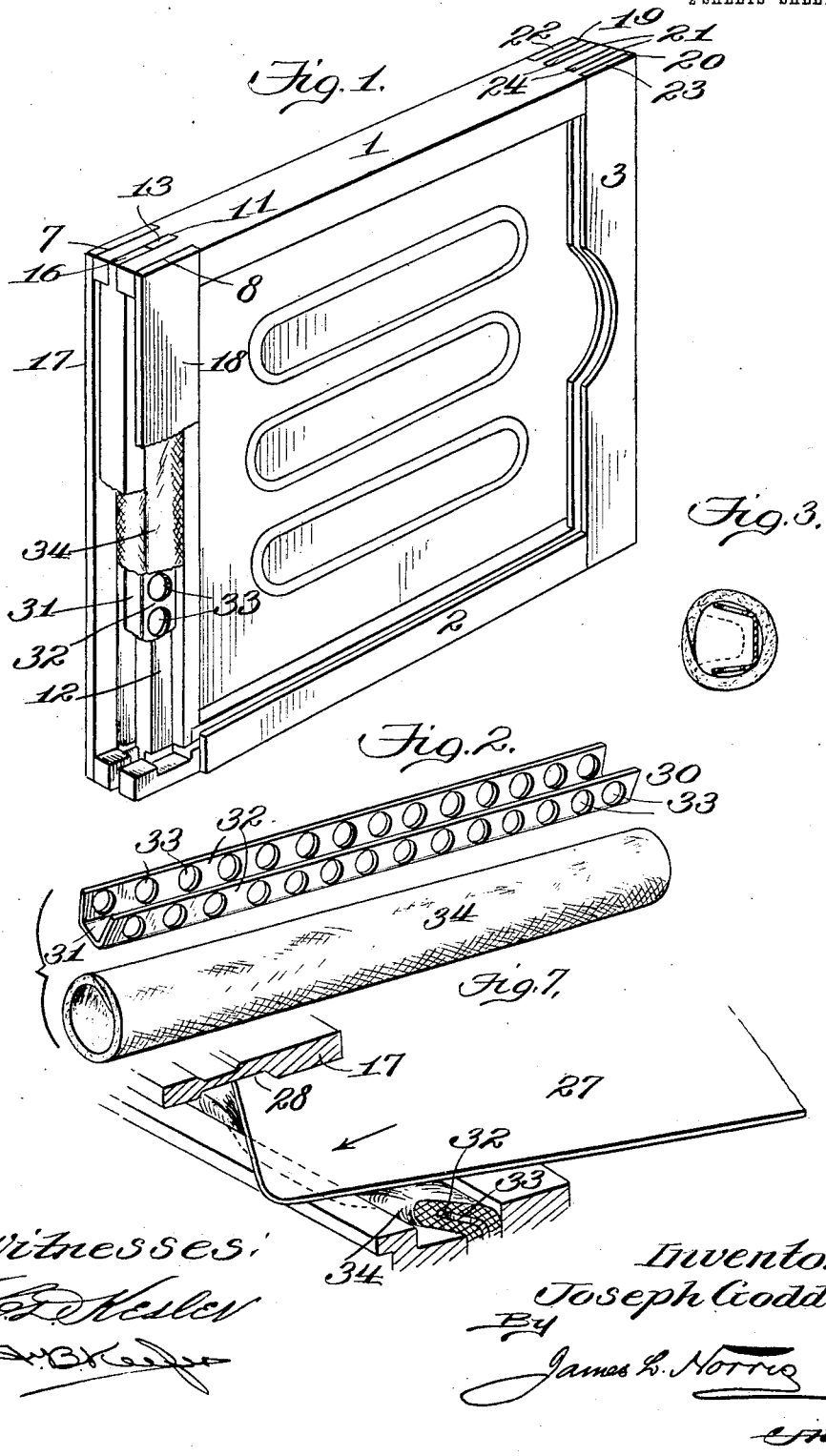

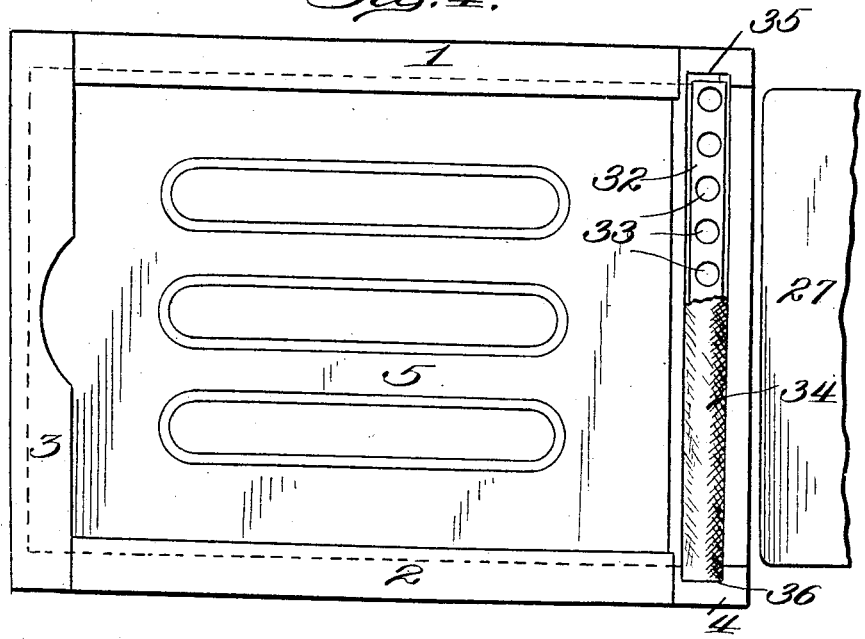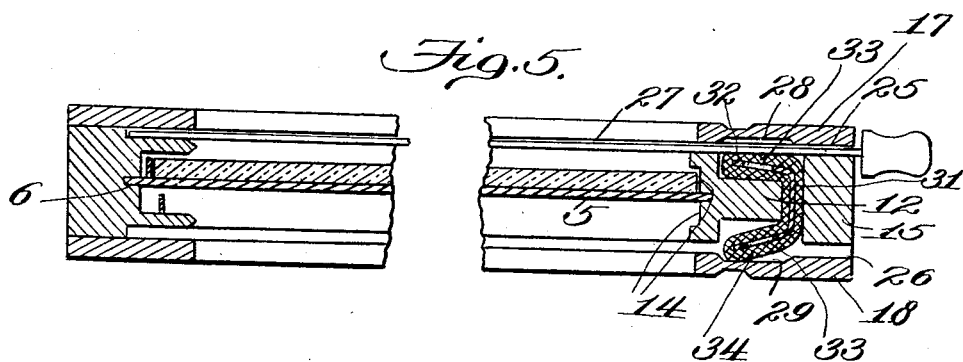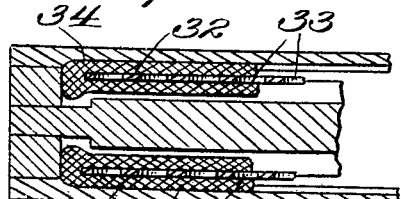

JOSEPH GODDARD, OF ROCHESTER, NEW YORK, ASSIGNOR TO SENECA CAMERA MANUFACTURING COMPANY, OF ROCHESTER, NEW YORK, A CORPORATION OF NEW YORK.

PHOTOGRAPHIC-PLATE HOLDER.

No. 925,895.

Specification of Letters Patent.

Patented June 22, 1909.

Application filed January 15, 1909. Serial No. 472,562.

*To all whom it may concern:*

Be it known that I, JOSEPH GODDARD, a citizen of the United States, residing at Rochester, in the county of Monroe and State of New York, have invented new and useful Improvements in Photographic-Plate Holders, of which the following is a specification.

My present invention relates to improvements in holders for photographic plates and similar sensitized mediums and it has for its object primarily to provide a plate holder of this character having a simple and improved light excluder or seal for preventing the entrance of light into the holder through the slot or passage for the usual shutter slide, the light excluder or seal being simple in its construction so that it may be made cheaply and assembled with the greatest facility, and which in practice is capable of effectually excluding light from the holder either while the slide is removed or inserted or during its insertion or removal, the light excluder or seal serving the further purpose of effectually preventing the leakage of light from one side of a double plate holder to the other side thereof past the seal.

To these and other ends, the invention consists in certain improvements, and combinations and arrangements of parts, all as will be hereinafter more fully described, the novel features being pointed out particularly in the claims at the end of the specification.

In the accompanying drawing: Figure 1 is a perspective view of a photographic plate holder constructed in accordance with the present invention, a portion thereof being broken away to illustrate the construction and arrangement of the light excluder or seal; Fig. 2 is a perspective view showing the parts comprising the light excluder or seal, the latter being removed from the plate holder; Fig. 3 represents an end view of the light excluder or seal showing the parts put together before application to the holder, the dotted lines indicating the shape of the felt envelop after the light excluder has been applied to the holder; Fig. 4 is a plan view of the holder showing one of the cover strips removed, a portion of the light excluder being broken away; Fig. 5 represents a longitudinal section of the plate holder showing one of the shutter slides inserted and the other removed; Fig. 6 represents an enlarged sectional view taken transversely of the holder and showing a portion of the light excluder or seal; and Fig. 7 is a perspective view of a section of the holder showing how the light excluder operates to prevent entrance of light should a corner of the shutter slide be inserted into the holder.

Similar parts are designated by the same reference characters in the several views.

My present invention is applicable generally to plate holders of various types, and in the present instance one specific embodiment of the invention is shown comprising a double plate holder, but it will be understood that the invention is not necessarily so limited, and that certain modifications or changes may be made in the detail construction or the arrangement of the parts in order that the invention may be utilized to the best advantage in each particular case.

In the present instance the plate holder consists of a frame, the dimensions of which may be varied according to the dimensions of the plates or sensitized mediums with which it is to be used, the frame consisting of a pair of side members 1 and 2 and a pair of end members 3 and 4. In the construction shown, the plate holder is a double one, that is to say, it is adapted to receive a plate at each side thereof, and the two sides of the plate holder are divided by the usual septum 5, the edges of which are preferably fitted into a recess 6 which is formed interiorly of the side and end members.

In order to firmly unite the side and end members at the corners and to prevent warping or accidental detachment thereof, it is preferable to form the corresponding ends of two of the frame members, the sides in the present instance with oppositely arranged recesses 7 and 8 which extend inwardly from the ends of the members and a central mortise 11 is also formed to extend inwardly from the same end of each member between the said recesses. A cross-piece 12 extends transversely between the recessed ends of the side members, this cross-piece having a tenon 13 at each end which fits into the central mortise 11 and partially fills the same, this cross-piece having undercut recesses 14 at its inner side to engage the adjacent edges of the plates which rest in the holder at opposite sides of the septum, and behind this cross-piece is arranged a second cross-piece 15, the latter also having tenons 16 which enter and fill the mortise 11. A pair of cover strips 17 and 18 also extend transversely between the side members. The opposite ends of the side members of the frame are also provided with oppositely formed recesses 19 and 20 and also with a pair of intermediate mortises 21 which extend inwardly from the respective ends of these members, and the end member 3 is provided at each end with a pair of tenons 22 and 23 which are adapted to fit into the correspondingly formed recesses, 19 and 20, respectively. The end member is also provided with a pair of intermediate tenons 24 which are adapted to enter the corresponding mortises. These tenons are introduced into the respective recesses and mortises by forcing the end piece inwardly from the end of the respective side member.

Between the cover strips and the cross-pieces are formed the usual slots or passages 25 and 26 adapted for the reception of the usual shutter slides 27, the side and remaining end member of the frame being correspondingly recessed interiorly to guide these slides and prevent the leakage of light past them. The inner sides of the cover strips 17 and 18 are preferably formed with recesses 28 and 29 which extend transversely of the holder for a distance equal to the width of the light excluder or seal, and this light excluder or seal in the present instance is composed of a spring 30 which is preferably of substantially channel form, that is to say, it comprises an intermediate portion 31 and a pair of oppositely arranged spring members 32. This spring is preferably formed from a sheet of relatively thin resilient metal, such for instance as spring steel, the longitudinal edges of the strip being bent flatwise of the metal to form the parallel longitudinally extending spring members at the opposite sides thereof. In order to obtain an efficient operation of the spring so as to prevent the entrance of light into the holder while the edge of the shutter slide is being introduced or removed, or because of warping or other unevenness in the surface presented to the light excluder by the slide, this spring member should be capable of a delicate yielding action at every point in its length. This result is accomplished in the present instance by providing the longitudinal rows of perforations 33 in the spring members, these perforations removing sufficient metal to weaken each spring member and thereby afford a delicate elasticity to every portion of the spring throughout its length, the portions of the metal between the perforations serving in effect as independent transversely extending spring portions, although the two edges of the spring members are unbroken or continuous.

A sleeve or envelop 34 of soft or yielding material, such for instance as felt, is slipped over the spring prior to the application thereof to the plate holder, this sleeve or envelop being preferably formed of a strip of flat material rolled into form, and the meeting edges thereof may be stitched or otherwise united.

The light excluder is introduced into the plate holder previous to the application of the second cross-piece 15, and as the light excluder is applied, the cross-piece 12 will enter the space formed between the oppositely arranged spring members, thereby pressing the felt or yielding material enveloping the spring into the space between the spring members, as shown in Fig. 5, so that the envelop assumes a form approximating that of the spring, although it envelops both the interior and exterior surfaces of the latter. The second cross-piece 15 is applied after the light excluder or seal has been inserted and is preferably forced down until the intermediate portions of the spring and the felt envelop or sleeve are firmly compressed between the second cross-pieces, thereby providing an efficient trap for preventing the leakage of light from one side of the plate holder to the other. The inner surfaces of the side members 1 and 2 are preferably provided with oppositely formed recesses 35 and 36 which extend outwardly beyond the side walls of the slots through which the shutter slides pass, and the light excluder is of a length greater than the width of the slots or passages for the shutter slides so that its ends will project into the recesses 35 and 36 and thereby prevent the leakage of light past its ends into the holder, the spring being of a length sufficient to enable it to be tilted into position between the recesses while the enveloping sleeve of felt may, of course, be sufficiently long to fully close the space between the recesses. While the shutter slide is removed from the holder, the felt or yielding material at that side of the plate holder will be pressed evenly by means of the spring into the transverse recess 29, thereby preventing the entrance of light through the slot or passage 26, as shown in Fig. 5, and during and after the insertion of the slide, the felt or yielding material will be pressed by the corresponding spring member evenly into engagement with the inner side of the slide, as shown in the said figure, thereby preventing the formation of any crevice through which light may leak to the plate within the holder. It frequently happens that in inserting or removing the slide with reference to the holder, one corner thereof will enter or leave before the other, and if the spring member were inflexible longitudinally, a leakage of light into the holder would in all probability occur. In the present instance, however, the peculiar formation of the spring enables those portions thereof which engage the felt to yield independently at every point so that while one portion of the felt may be held in open position by a corner of the shutter slide, the remainder of the felt will be evenly pressed into closed position, and the felt is also evenly pressed against the slide, even though the latter should become warped or otherwise distorted so as to offer an irregular surface to the felt.

By providing a light excluder wherein the felt or yielding material to engage the slide is made in the form of a sleeve or envelop which surrounds the spring, it is only necessary to insert the spring member into the tube or envelop, and to then apply the parts to the holder, the felt being effectually held in position without the possibility of displacement, and the use of cement, rivets or other devices heretofore employed to secure the felt to the spring is avoided. The channel form of the spring provides a pair of spring members, one for each side of the holder, although the spring is composed of one part only, and the spring with the enveloping felt may be applied to the holder with the greatest facility, the inner cross-piece pressing the felt into the space between the spring members as the parts are applied, and the second cross-piece when applied serves to lock the parts in proper relation to each other and also with respect to the holder. By forming the spring members with longitudinal rows of perforations, the necessary delicate spring action hereinbefore described is attained, the operation of punching these perforations being simple and inexpensive, and, moreover, the longitudinal edges of the spring members are continuous or unbroken, so that there are no sharp edges formed which might catch within the felt sleeve as the spring is introduced therein. As the felt or yielding material envelops the spring member, it is thereby held in proper engagement therewith, rendering it unnecessary to use cement or rivets to secure the felt to the spring, such devices being unsatisfactory or objectionable.

I claim as my invention:

1. A light seal for photographic plate holders comprising a spring member adapted to be secured at one of its longitudinal edges, the opposite edge thereof being adapted to move across the passage for the shutter slide, and an envelop of soft yielding material surrounding the spring member and adapted to be pressed by the latter into engagement with the shutter slide.

2. A light seal for photographic plate holders comprising a spring member adapted to extend longitudinally across the passage for the shutter slide and mounted for tilting movement, and a sleeve-like body of felt surrounding and inclosing said spring member transversely.

3. A light seal for photographic plate holders comprising a spring member adapted to extend across the passage for the shutter slide, the spring member being provided between its longitudinal edges with a row of weakening perforations which render every portion of the spring member throughout its length independently yieldable.

4. A light seal for photographic plate holders comprising a metal spring member adapted to extend across the passage for the shutter slide and being provided between its longitudinal edges with a row of perforations which permit a delicate yielding of every portion of the member throughout its length, both longitudinal edges of the member being continuous or unbroken, and a sleeve-like body of felt or other yielding material surrounding the spring member.

5. A light seal for photographic plate holders comprising a spring of channel form providing a pair of oppositely arranged spring members, and a sleeve-like body of yielding material wholly surrounding the spring.

6. A light seal for photographic plate holders comprising a spring having a pair of oppositely arranged longitudinally extending spring members, a sleeve-like body of yielding material wholly enveloping the spring, and a part interposed between the oppositely arranged spring member and pressing a portion of the yielding material into the space formed between them.

7. A light seal for photographic plate holders comprising a spring of approximately channel form having an intermediate securing portion and a pair of oppositely arranged spring members, a sleeve-like body of yielding material wholly enveloping the spring, a cross-piece arranged in the plate holder and interposed between the spring members to press a portion of the yielding material in the space formed between said members, and a second cross-piece engaging the spring and its enveloping sleeve opposite to the cross-piece first mentioned.

8. A photographic plate holder comprising a pair of side members provided with mortises extending inwardly from their corresponding ends, a cross-piece having tenons engaging in and partially filling the respective mortises, a light excluder comprising a spring of approximately channel form having oppositely arranged spring members arranged at opposite sides of said cross-piece, a sleeve-like body of yielding material wholly enveloping the spring and having a portion thereof pressed by the cross-piece into the space between said spring members, and a second cross-piece having tenons engaging in said mortises and adapted to coöperate with the cross-piece first mentioned to retain the light excluder in position.

In testimony whereof I have hereunto set my hand in presence of two subscribing witnesses.

JOSEPH GODDARD.

Witnesses:
GEO. GAGIMAR,
FRED K. TOWNSEND.